Sept. 7, 1954

E. F. WADLEY ET AL 2,688,629

METHOD FOR CONTROLLING A HYDROCARBON SYNTHESIS REACTION

Filed Dec. 29, 1949

INVENTORS.
Edward F. Wadley,
James A. Anderson Jr.,
BY
AGENT.

INVENTORS.
Edward F. Wadley,
James A. Anderson Jr.,

Patented Sept. 7, 1954

2,688,629

UNITED STATES PATENT OFFICE 2,688,629

METHOD FOR CONTROLLING A HYDROCARBON SYNTHESIS REACTION

Edward Frank Wadley and James A. Anderson, Jr., Baytown, Tex., assignors to Standard Oil Development Company, Elizabeth, N. J., a corporation of Delaware Application December 29, 1949, Serial No. 135,692

6 Claims. (Cl. 260—449)

The present invention is directed to a method for controlling a hydrocarbon synthesis reaction in which hydrogen and carbon monoxide react to form hydrocarbons and oxygenated organic compounds. In practicing the present invention a feed mixture of carbon monoxide and hydrogen is reacted at a reacting temperature and pressure in the presence of a catalyst selected from group VIII of the periodic table whereby oxygenated organic compounds and hydrocarbons are produced and carbon is formed in and on the catalyst. A vaporous stream of at least a portion of the hydrocarbons is separated from the catalyst and the vaporous stream is exposed to a beam of light having wave lengths in the range between 225 and 270 millimicrons to obtain an electrical potential which is a function of the rate of carbon formation in and on the catalyst. The carbon content of the catalyst is controlled by varying, in response to variations in the electrical potential, a suitable process variable which affects the rate of carbon deposition in and on the catalyst.

The production of liquid fuels by the reaction of carbon monoxide and hydrogen using iron containing catalysts is limited in its commercial application by excessive carbon formation in and on the catalyst with attendant catalyst disintegration. It appears that the carbon is deposited on the catalyst in the interstices of the catalyst as iron carbide which is converted to carbon and causes expansion of the iron catalyst and resulting disintegration theerof. In conducting such operations by so-called fluid or powder techniques the catalyst may be rapidly lost from the system.

Some of the more advantageous catalysts for these reactions are iron containing catalysts such as gamma $Fe_2O_3$, $Fe_3O_4$, suitably promoted with alkali metal compounds such as alkali metal carbonates, oxides, hydroxides and various alkali metal salts.

These catalysts, however, have a tendency to form excessive amounts of carbon which results in the difficulties mentioned before. By virtue of the formation of excessive amounts of carbon the reaction frequently becomes uncontrollable, resulting in the shutdown of the operation.

Several methods may be employed for reducing the rate of deposition of carbon in and on hydrocarbon synthesis catalysts. These methods include increasing the hydrogen partial pressure in the reactor, either by maintaining the $H_2:CO$ ratio in the reactor feed gas and increasing the total reactor pressure, or by increasing the ratio of $H_2:CO$ in the reactor feed gas. Other means of reducing carbon formation include the injection of steam into the feed to the reactor.

In accordance with the present invention the formation of carbon in the synthesis of hydrocarbons and oxygenated organic compounds from carbon monoxide and hydrogen when metals or compounds of metals from group VIII of the periodic table, such as the oxides thereof, are employed as catalyst, may be substantially reduced. This is accomplished by continuously or intermittently withdrawing a portion of the liquid hydrocarbon fraction and forming the withdrawn portion of the liquid hydrocarbon fraction into a vaporous stream which is exposed to a beam of light having a wave length in the range between 225 and 270 millimicrons to obtain an electrical potential which is a function of the rate of carbon formation in and on the catalyst. The rate of deposition of carbon in and on the catalyst may therefore be controlled by varying, in response to variations of the electrical potential so obtained, any one or several of the following process variables: (a) the $H_2:CO$ ratio in the total feed gas; (b) the total pressure of the reactor system; or (c) the injection of steam into the reactor. Other means for changing the rate of carbon deposition in and on the catalyst may also be employed in response to the variation of the electrical potential in accordance with my invention. The vaporized stream is exposed to a beam of light having wave lengths in the range given by passing it through a sample cell of a spectrophotometer through which a beam of light is passed. A portion of the light is absorbed by the hydrocarbon while the remainder is unabsorbed. The unabsorbed light passing through the cell in the spectrophotometer is converted to an electrical potential by well known means such as impingement on a photoelectric cell which causes generation of the potential. The electrical potential derived from the spectrophotometer may be amplified in a conventional and well known manner and impressed upon a recorder controller which in turn actuates a flow control means which causes the admission of extraneous hydrogen to the feed admixture, thus raising the partial pressure of the hydrogen in the feed mixture; or the electrical potential through the recorder controller may be caused to operate a pressure control means in the system which raises the pressure on the reaction and thus raises the partial pressure of the hydrogen in the mixture undergoing reaction.

The ultraviolet absorption spectra of materials are essentially the same in either the liquid or the vapor phase. It is preferred to use the vapor phase with most plant control processes because of the comparative ease with which vapor phase sample handling systems may be devised for spectrophotometric systems. The liquid phase is generally useful for systems having low absorption coefficients or low concentration of the absorbing material. However, the liquid phase may be used for systems having relatively high light absorption by employing a constant ratio blending system to dilute the sample with a known amount of a relatively transparent solvent or by using a sample cell of suitable thickness, probably on the order of less than one millimeter thick.

The invention will be further illustrated by reference to the drawing in which:

Fig. 1 is a flow diagram of a preferred mode of practicing the invention;

Figure 2:
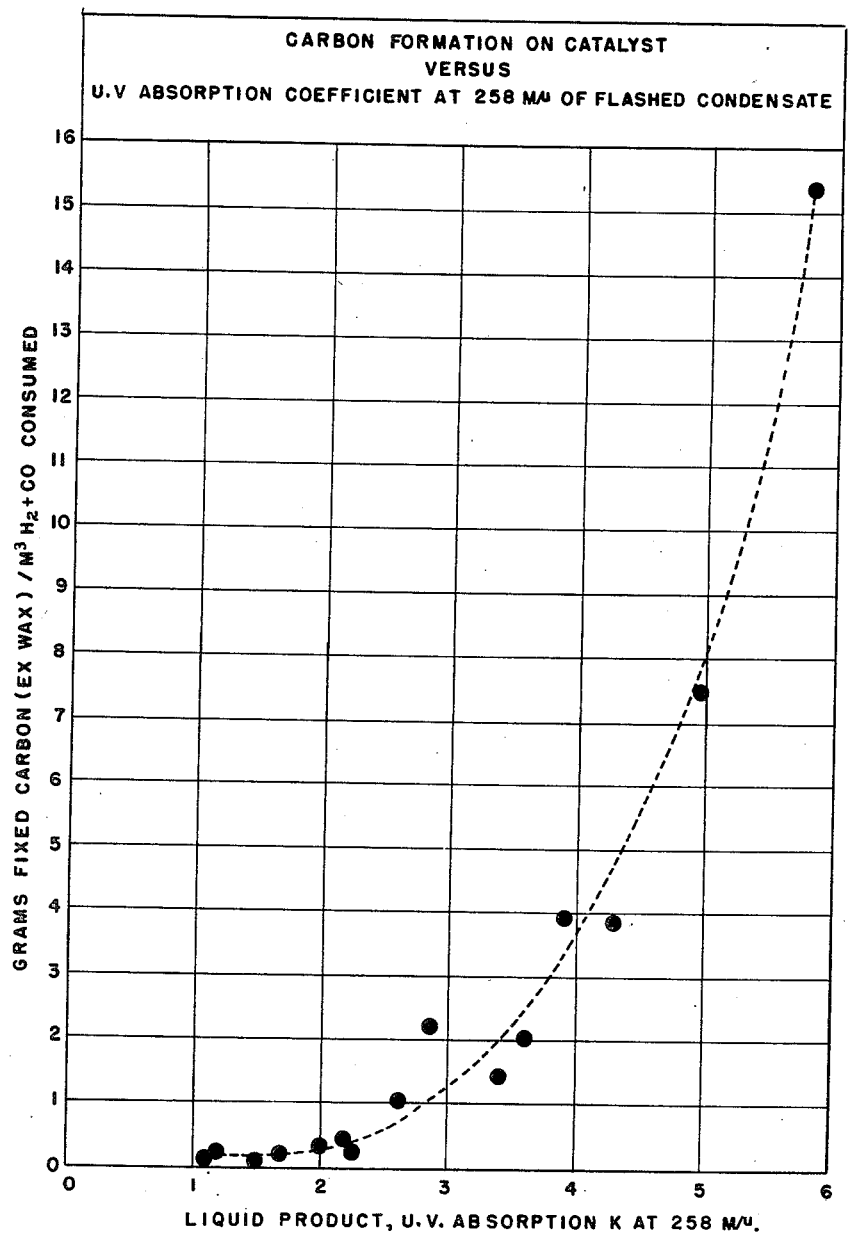
Fig. 2 is a chart of data showing the relationship between carbon produced per cubic meter of carbon monoxide and hydrogen consumed and the ultraviolet absorption coefficient of the liquid synthesis product at a wavelength of 258 millimicrons.

Referring now to the drawing and particularly to Fig. 1, numeral 11 designates a feed line through which a mixture of carbon monoxide and hydrogen is introduced into the system from a source not shown. The feed mixture of carbon monoxide and hydrogen may be in proportions in the range from 1:1 to 1:2 and flows by way of line 11 through a flow controller 12 whose function will be described further later on, and thence into line 13 wherein there is suspended in the gaseous mixture a catalyst such as gamma iron oxide in fluidizable powder form, introduced thereto from catalyst hopper 14 by line 15. The catalyst introduced into line 13 by line 15 may be at an elevated temperature sufficient to cause reaction of the carbon monoxide and hydrogen to produce hydrocarbons and oxygenated organic compounds. The suspension of catalyst in carbon monoxide and hydrogen passes by line 13 into a reactor 16 wherein temperatures and pressures are adjusted to allow the reaction to proceed to form a product including hydrocarbons and oxygenated organic compounds. The temperature in reactor 16 will be in the range from about 300° to about 750° F. with pressures from about atmospheric up to as much as 600 p. s. i. g. Since the reaction of carbon monoxide and hydrogen results in the liberation of excessive amounts of heat, which, if not removed, would raise the temperature in reactor 16 drastically, provision is made for removing this heat by circulating a cooling fluid, such as water, through a cooling means illustrated by coil 17 which is located in reactor 16. It is understood that while the cooling means has been illustrated by coil 17, other cooling means may be employed.

The velocity of the catalyst-carrying feed mixture in reactor 16 is adjusted such that a dense phase consisting of catalyst and reactants and reaction products is formed. The catalyst and the reaction products, as well as unreacted feed mixture, discharge from reactor 16 by line 18 in which is located a pressure controller 19 whose function will be described later. The discharged stream in line 18 passes into a catalyst separator 20 which may be of the cyclone type which removes substantially all the catalyst from the product and allows the catalyst to drop downwardly from separator 20 into a first catalyst hopper 21, while the reaction product and unreacted gases pass by way of line 22 into a second catalyst separator 23 to cause removal therefrom of catalyst fines. These fines may be discharged from separator 23 by line 24 controlled by valve 25, or may be routed back to hopper 21 by line 26 controlled by valve 27.

The products, including unreacted gases, discharged from separator 23 by line 28 are cooled by passage through a cooler 29 and then discharged by line 30 into a product separator 31 wherein a separation is made between gaseous and liquid products and where water is removed as will be described further.

The catalyst in hopper 21 may have deposited thereon, besides the carbon which is laid down by the reaction, heavy paraffinic hydrocarbons of a waxy nature. Since these heavy waxy hydrocarbons may interfere with the efficiency of the reaction, it may be desirable to remove them before the catalyst is returned to reactor 16, as will be described. Therefore, it may be desirable to withdraw all or part of the catalyst in hopper 21 by line 32 controlled by valve 33 into a wax removal unit 34 wherein a portion or all of the catalyst may be treated with a suitable solvent such as middle oil, benzene, pyridine, alcohols, or liquid substances formed during the reaction itself for removal of waxy hydrocarbons, after which the catalyst, substantially free of wax is discharged by line 35 into hopper 14 for use in the synthesis reaction as has been described. It is understood that wax removal unit 34 is indicated schematically and will include all auxiliary facilities necessary therefor. Suitable apparatus for removing wax is described in U. S. 2,159,140.

Since it may be unnecessary to treat all of the catalyst for removal of wax, line 36 which is controlled by valve 37 is provided whereby a portion of the catalyst may be caused to by-pass unit 34 and discharge directly into line 35 for routing to hopper 14.

In separator 31 a separation is made between gaseous and liquid products, the gaseous material, including unreacted carbon monoxide and hydrogen and carbon dioxide formed in the reaction, is removed from separator 31 by line 38 controlled by valve 39 and may be recycled to reactor 16 by way of lines 11 and 13 for re-use in the process. In some instances it may be desirable to discharge a portion of the recycled gas and, therefore, line 40 controlled by valve 41 is provided.

In separator 31 a separation is also made between liquid hydrocarbons and water produced in the reaction. The liquid hydrocarbons and the water will contain oxygenated organic compounds with the more water soluble compounds found in the water layer, while the more hydrocarbon soluble are found in the hydrocarbon layer. The water layer is withdrawn from separator 31 by line 42, while the hydrocarbon layer is withdrawn by line 43 controlled by valve 44. The greater portion of the hydrocarbon stream is routed by line 45, controlled by valve 46, to a fractionation system, not shown, while a minor portion is employed to operate the control system, as will be described further.

During the reaction in reactor 16 a considerable amount of carbon is formed in and on the catalyst. Heretofore the only known way to determine the amount of carbon on the catalyst was to withdraw a portion of the catalyst from the reaction system and test it for carbon content. It has now been found, however, that the rate of carbon formation on the catalyst employed in reactor 16 in the synthesis of organic materials from carbon monoxide and hydrogen is related to the concentration of conjugated materials in the synthesis product. Thus, by determining the amount of conjugated materials in the synthesis product it is possible to determine the rate at which carbon is formed in and on the catalyst. This discovery is employed in the practice of the present invention to control the synthesis operation by varying the hydrogen partial pressure, which in turn results in the control of the carbon content, in response to variations in the concentration of conjugated materials in the hydrocarbon product. To this end a portion of liquid hydrocarbon product in line 43 passes into a vaporizer 47 provided with a heating means illustrated by coil 48 through which a heating material is circulated to cause heating to approximately 500° F. and to cause vaporization thereof. The vaporized hydrocarbon stream discharges into line 49 provided with a pressure controller 50 into an ultra-violet spectrophotometer 51. Ultraviolet spectrophotometer 51 employs a sample cell having a thickness of the order of 0.25 cm. maintained at a pressure of about 100 millimeters mercury absolute, the pressure being controlled by pressure controller 50, and maintained by a vacuum pump 52 connected by line 53 to vessel 54, vessel 54 in turn connects by line 55 to spectrophotometer 51. The reduced pressure in tank 54 causes pressure controller 50 to be operated. After the vaporized stream has passed through the sample cell in spectrophotometer 51 it may be discharged from the system by line 56.

It will be understood that ultraviolet spectrophotometer 51 comprises all auxiliary equipment usually associated with such ultraviolet spectrophotometers. A typical detecting and recording system for ultraviolet light is described in an article by E. J. Rosenbaum and L. Stanton entitled "Continuous recording ultraviolet spectrophotometer" and published in "Industrial and Engineering Chemistry, Analytical Edition" for October 1947, pages 794 through 798. The unabsorbed light is converted by means of an instrument of this type into an electrical potential which is fed by way of conductor 57 into a recorder controller device 58 which may be employed to convert the electrical potential into mechanical movement or displacement. Such a recorder controller may be illustrated by the Brown electronic continuous balance potentiometer controller in which an incoming D. C. signal is converted to an A. C. signal by a vibrator and is amplified electronically. The amplified signal is then caused to drive a reversible motor whose shaft is mechanically connected to a recording pen and potentiometer slide wire. The output of the potentiometer is applied in opposition to the D. C. signal from the spectrophotometer so that any difference between the potentiometer and analyzer signals will be amplified and cause a rotation of the motor to bring the potentiometer and the anlyzer signals into exact balance.

In this way, the recorder controller pen deflects by an amount which is proportional to the absorption of light by the vapor stream passing through the sample cell of spectrophotometer 51. As pointed out previously, this absorption, which is a function of the conjugated organic compounds content of the reactor product stream in line 43, is directly related to the rate at which carbon is formed on the catalyst in reactor 16. The mechanical movement produced in the recorder controller is arranged to change the position of a "flapper and nozzle" arrangement well known in the instrument art for operating, by means of compressed air, either flow, or pressure, controllers as will be described further. Leading from recorder controller 58 to pressure controller 19 in line 18 is a conduit or means 59, controlled by valve 60, by means of which the potential from spectrophotometer 51 may be caused to operate pressure controller 19. There is led from recorder controller 58 a conduit 61 controlled by valve 62 to a flow controller 63 which is located in line 64 and which connects into line 11. Line 64 connects to a source of auxiliary hydrogen supply, not shown. A conventional flow controller which may be employed in the practice of my invention is described in "Industrial Instruments for Measurement and Control," by Rhodes, McGraw-Hill Book Co., first edition, New York, 1941, page 489.

Although the present invention has been illustrated to show the control of the rate of carbon formation by using the ultraviolet spectrophotometer and associated equipment to control hydrogen partial pressure, there are other means for controlling the rate of carbon formation which may be readily controlled by the spectrophotometer and associated control apparatus such as water or steam injection into the feed gas to the reactor. This may be further illustrated by referring to Fig. 1 wherein line 68 containing controller 69 is a source of steam which may be placed directly into the feed in line 11. Flow controller 69 is connected to the recorder-controller 58 by means of line 70 through which the controlling impulse is transmitted and will act to regulate the amount of steam placed into the feed.

As stated before, the rate of carbon formation on the catalyst in reactor 16 may be determined by the conjugated material content of the product in line 43. Therefore, in operation of the present invention the deposition of carbon in and on the catalyst during the reaction of carbon monoxide and hydrogen in reactor 16 is controlled by subjecting a portion of the naphtha withdrawn from separator 43 to vaporization to form a vaporized stream which is passed through a sample cell and ultraviolet spectrophotometer 51 to cause absorption when subjected to light at a wave length in the range between 225 and 270 millimicrons. At this wave length a portion of the light is absorbed which is a function of the content of conjugated materials in the vaporized stream which in turn is a function of the carbon formed on the catalyst in reactor 16. By means of the detector which is exposed to the unabsorbed light, the degree of absorption of light of the specified wave length by the conjugated material may be converted to an electrical potential which, as has been explained, is amplified and impressed on recorder-controller 58, which, in turn, may cause pressure controller 19 or flow controller 63 to operate. If recorder-controller 58 is connected by conduit 61 and valve 62 to flow controller 63 a change in the concentration of conjugated materials in the stream flowing through line 43 will cause the recorder-controller to transmit a signal to flow controller 63 which, in turn, will admit hydrogen to line 11 through line 62. Admission of hydrogen will raise the partial pressure of hydrogen in the mixture undergoing reaction in reactor 16, and, in turn, will decrease the formation and deposition of carbon in the catalyst in reactor 16. On the other hand, rather than controlling the flow of auxiliary hydrogen to line 11, the same end may be achieved by closing valve 62 in line 61 and opening valve 60 in conduit 59 communicating recorder controller 58 with pressure controller 19. By causing the recorder-controller to actuate pressure controller 19 the pressure in reactor 16 may be increased and thus partial pressure of hydrogen in the reactor 16 may also be increased, thus suppressing the formation of carbon on the catalyst in reactor 16. Rather than cause pressure controller 19 to operate, recorder-controller 58 may be employed to increase the flow of feed mixture to reactor 16 while maintaining the pressure therein constant. This may be accomplished by causing the impulse from recorder 58 to actuate controller 12 through conduits 59 and 65 whereby the same end may be achieved.

If the rate of carbon formation should become so excessive as to endanger the reaction system or the catalyst, recorder-controller 58 may be utilized to produce an impulse which will be transmitted through line 66 to flow controller 12 to stop the flow of feed to the reactor. Under ordinary operating conditions, recorder-controller 58 will act only to adjust the partial pressure of the hydrogen by either increasing the amount of hydrogen in the feed or increasing the total pressure of the feed in the reactor.

Oxygenated hydrocarbons such as those found in typical hydrocarbon synthesis naphthas do not interfere significantly with ultraviolet absorption measurements in the 225 to 270 millimicron ultraviolet region; therefore, the preferred application of the present invention has been illustrated by utilizing a stream from the synthesis unit which includes the total liquid product. The absorption of the oxygenated compounds is negligible for the wave length region used for the control instrument; therefore, a very satisfactory control may also be obtained by using in the control system a liquid hydrocarbon stream free of oxygenated compounds.

Figure 3:
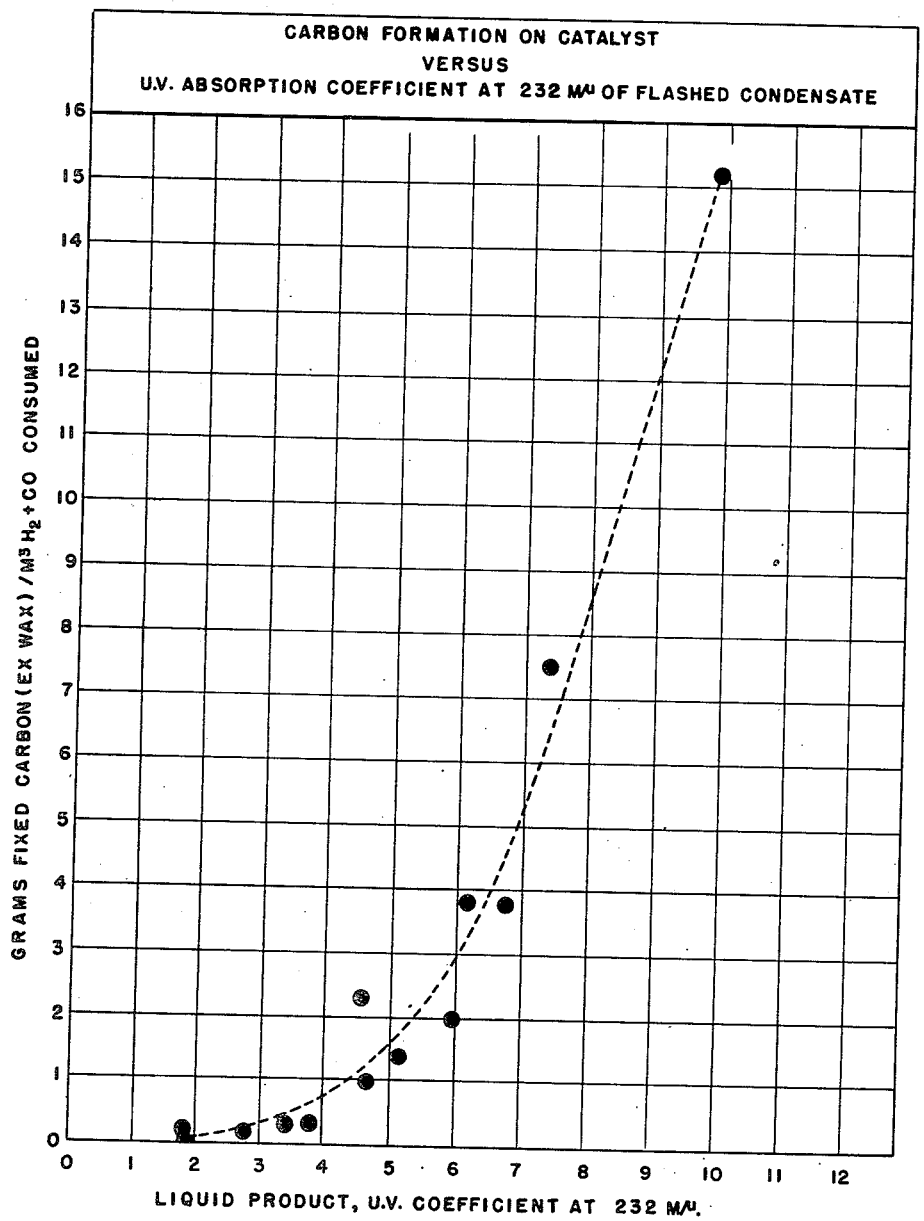
Fig. 3 is a similar chart of data showing the same relationship at a wave length of 232 millimicrons.

In order to illustrate the invention further, reference will now be made to Figures 2 and 3 which are in the form of charts presenting a graph of data wherein the grams of carbon formed during a given time interval or reaction period per cubic meter of hydrogen and carbon monoxide consumed is plotted, respectively, against the ultraviolet coefficient absorption constant at 258 millimicrons and 232 millimicrons for a liquid product similar to that withdrawn by line 43. It will be seen from an examination of the data in Figures 2 and 3 that the rate of carbon formation varies directly with the ultraviolet absorption coefficient at wave lengths of light of 232 and 258 millimicrons.

It has been observed that the absorption coefficient at other wave lengths in the range of 225 to 270 millimicrons also varies in proportion with the carbon formation. Thus, it is not necessary to use mono-chromatic radiation with a wave length of exactly 232 or 258 millimicrons but radiation anywhere within the range of 225 to 270 millimicrons is satisfactory. Therefore, the absorption coefficient at wave lengths between 225 and 270 millimicrons allows a direct value of the rate at which carbon is formed in reactor 16 to be obtained. In view of this relationship it is possible to convert the output from a spectrophotometer, through which a vaporous stream produced in such an operation is passed, to an electrical potential which will allow the regulation of the partial pressure of the hydrogen in the feed mixture and thus will cause regulation of the carbon content of the catalyst.

The present invention has been illustrated by employment of group VIII catalysts such as iron oxide and especially gamma iron oxide and $Fe_3O_4$. It is to be understood that other of the group VIII catalysts may be employed such as cobalt, nickel and ruthenium, either as the metals or oxides thereof. It is also to be understood that iron may be used as the metal or oxides. Catalysts of this type may be suitably promoted with alkali metal compounds such as the sodium, potassium and lithium carbonates, oxides, hydroxides, as well as the fluorides, chlorides and other salts of the alkali metals mentioned before.

The present invention has been described and illustrated with reference to the fluidized powder technique. When such an operation is employed the catalyst may have particle diameters ranging up to 200 microns with the major portion of the catalyst having diameters ranging from 20 to 80 microns to allow fluidization of the catalyst powder.

Although the invention has been illustrated by reference to the fluidized powder technique where the catalyst is suspended in the feed gases, it is to be clearly understood that the operation may be conducted by maintenance of the catalyst in beds in catalyst cases. In such operations the catalysts may be in the form of pills, pellets or rods. In fixed bed operations it may be desirable to employ a plurality of catalyst cases such that the catalyst may be treated in one while the other is on the reaction cycle.

The nature and objects of the present invention having been completely described and illustrated, what I wish to claim as new and useful and to secure by Letters Patent is:

1. In a process in which a gaseous feed mixture of carbon monoxide and hydrogen is reacted at a reaction temperature and pressure in a reaction zone in the presence of a catalyst comprising the metals and oxides thereof selected from group VIII of the periodic table to form a product comprising hydrocarbons and oxygenated organic compounds in which carbon is deposited in and on said catalyst and said product is separated from said catalyst, the steps of cooling said product to form a liquefied product comprising hydrocarbons and oxygenated organic compounds, exposing at least a portion of said liquefied hydrocarbon-containing product to a beam of light having a wave length in the range of 225 to 270 millimicrons, absorbing at least a portion of said light and leaving an unabsorbed portion, obtaining from said unabsorbed portion an electrical potential which is a function of the rate at which carbon deposits in and on said catalyst and increasing the partial pressure of hydrogen in said feed mixture in response to increases in said electrical potential and decreasing the partial pressure of hydrogen in said feed mixture in response to decreases in said electrical potential, whereby the rate of carbon deposition in and on the catalyst is reduced.

2. A process in accordance with claim 1 in which the partial pressure of hydrogen in the feed mixture is increased by adding hydrogen thereto.

3. A process in accordance with claim 1 in which the partial pressure by hydrogen in the feed mixture is increased and decreased by increasing and decreasing the pressure in the reaction zone.

4. In a process in which a gaseous mixture of carbon monoxide and hydrogen is reacted at a reaction temperature and pressure in a reaction zone in the presence of a catalyst comprising the metals and oxides thereof selected from group VIII of the periodic table to form a product comprising hydrocarbons and oxygenated organic compounds and in which carbon is formed in and on said catalyst and said product is separated from said catalyst, the steps of cooling said product to form a liquefied product comprising hydrocarbons and oxygenated organic compounds, withdrawing a stream of said liquefied hydrocarbon-containing product, vaporizing said withdrawn stream, exposing said vaporous stream to a beam of light having a wave length in the range between 225 and 270 millimicrons, absorbing at least a portion of said light, a portion of said light being unabsorbed, converting said unabsorbed portion of light to an electrical potential which is a function of the amount of carbon formed in and on said catalyst, and increasing the partial pressure of hydrogen in said mixture in response to increases in said electrical potential and decreasing the partial pressure of hydrogen in said feed mixture in response to decreases in said electrical potential, whereby the rate of carbon deposition in and on said catalyst is reduced.

5. A process in accordance with claim 4 in which the partial pressure of hydrogen in the feed mixture is increased by adding hydrogen thereto.

6. A process in accordance with claim 4 in which the partial pressure of hydrogen in the feed mixture is increased and decreased by increasing and decreasing the pressure in the reaction zone.

References Cited in the file of this patent

UNITED STATES PATENTS

| Number | Name | Date |
|---|---|---|
| 2,251,554 | Sabel et al. | Aug. 5, 1941 |
| 2,257,457 | Fischer et al. | Sept. 30, 1941 |
| 2,271,259 | Herbert | Jan. 27, 1942 |
| 2,276,274 | Keith, Jr. | Mar. 17, 1942 |
| 2,318,626 | Pier et al. | May 11, 1943 |
| 2,459,404 | Anderson, Jr. | Jan. 18, 1949 |
| 2,462,946 | Coggeshall et al. | Mar. 1, 1949 |
| 2,462,995 | Ritzmann | Mar. 1, 1949 |
| 2,518,307 | Grobe | Aug. 8, 1950 |
| 2,589,925 | Cain et al. | Mar. 18, 1952 |